United States Patent Office 2,974,147
Patented Mar. 7, 1961

2,974,147

2-BUTENEDIOL(1,4) WITH HEXACHLOROCYCLIC-PENTADIENE AND SUBSEQUENT ACETAL-FORMATION BY MEANS OF FORMALDEHYDE

Franz Marschall, Easton, Pa., and Raymond L. Mayhew, Phillipsburg, N.J., assignors to General Aniline & Film Corporation, New York, N.Y., a corporation of Delaware No Drawing. Filed Dec. 2, 1958, Ser. No. 777,588

3 Claims. (Cl. 260—340.3)

The present invention relates to the Diels-Alder adduct of 2-butenediol(1,4) with hexachlorocyclopentadiene and subsequent acetal-formation by means of an aldehyde to yield a new and useful compound.

We have found that 2-butenediol(1,4) undergoes the Diels-Alder reaction with hexachlorocyclopentadiene and that this adduct can be made to react with formaldehyde to yield a formal derivative having unexpected and effective insecticidal properties.

The Diels-Alder adduct is prepared by condensing 1 mole of hexachlorocyclopentadiene and 1 mole of 2-butenediol(1,4) in the presence of dioxane as a solvent diluent. The condensation is conducted by heating to reflux and kept at reflux for a period of 15–30 hours. Thereafter from 1 to 2 parts by volume of xylene per volume of the condensation reaction mixture is added and the mixture cooled. At about 100° C. copious crystallization takes place. At this point high boiling petroleum ether, in an amount ranging from 1 to 2 parts by volume based on the volume of dioxane, is then added to the mixture and the mixture cooled to about room temperature (about 25° C.) and stirred at this temperature for a period of 2 to 3 hours. It is then filtered and washed with a solution containing 1 part by volume of dioxane, 1 part by volume of petroleum ether and 2 parts by volume of xylene. The resulting Diels-Alder adduct, approximately 1 mole, is charged into a suitable vessel with 1 mole of an aldehyde, such as for example, formaldehyde, paraformaldehyde, acetaldehyde, acrolein (propenal), benzaldehyde, p-tolualdehyde, phenylacetaldehyde, β-naphthaldehyde, furfuraldehyde, and the like in the presence of 0.01 to 0.03 moles of ferric chloride and 3 to 8 moles of dioxane. It is to be noted that instead of parts by volume, parts by weight of the dioxane, petroleum ether and xylene may also be employed with satisfactory results. The charged mixture is then heated on the steam bath for a period of 3 to 7 hours. Most of the dioxane is removed by distillation and a sufficient quantity of high boiling petroleum ether equivalent in weight (or volume) to twice the weight (or volume) of the Diels-Alder adduct is added and the mixture cooled to a temperature ranging between 10° and 15° C., stirred at this temperature for about 1½–2½ hours. The crystalline product is then removed by filtration and washed with high boiling petroleum ether. The reactions involved may be characterized in the following manner:

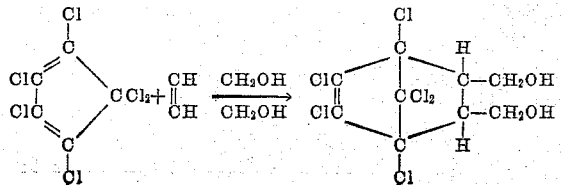

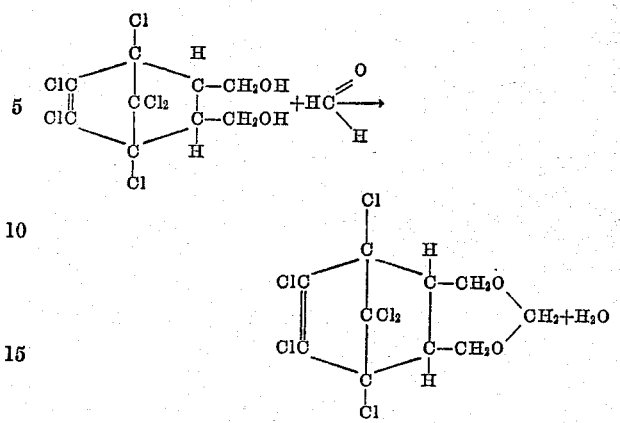

The following examples are illustrative of the preparation of the Diels-Alder adduct, the acetal-formation of the Diels-Alder adduct with an aldehyde and the utility of the resulting formal derivative as an insecticide.

EXAMPLE I

Into a three liter flask is charged 546 parts by weight of hexachlorocyclopentadiene (2.0 moles), 220 parts by weight of 2-butenediol-(1,4) (2.50 moles) and 300 parts by weight of dioxane. The mixture is heated to reflux and kept at reflux for a period of 18–24 hours. 530 parts by weight of xylene is added and the mixture is cooled. At about 100° C. abundant crystallization takes place. 220 parts by weight of high boiling petroleum ether is then added, the mixture is cooled to about 25° C. and stirred at this temperature for 2–3 hours. It is then filtered and washed with a solution containing 1 part by weight of dioxane, 1 part by weight of petroleum ether and 2 parts by weight of xylene. A yield of 436 parts by weight of practically pure adduct is obtained having a melting point of 207–208° C.

Analysis calculated for $C_9H_8Cl_6O_2$ (M.W. 360.89). Calc. C, 29.95; H, 2.23; Cl, 58,95. Found: C, 29.90; H, 2.43; Cl, 58.65.

EXAMPLE II

Into a one liter flask is charged 180.5 parts by weight of Diels-Alder adduct of Example I (0.50 mole), 15.02 parts by weight of paraformaldehyde equivalent to 0.50 mole of formaldehyde, 1.25 parts by weight of ferric chloride and 180 parts by weight of dioxane. The mixture is heated on the steam bath for 4–6 hours. Most of the dioxane is then removed by distillation and 350 parts by weight of xylene and 300 parts by weight of high boiling petroleum ether is added. The mixture is cooled and filtered from any unreacted Diels-Alder adduct. From the filtrate most of the solvent is removed by distillation. 350 parts by weight of high boiling petroleum ether is added and the mixture cooled to 10–15° C., stirred at this temperature for about 2 hours. The crystalline product is removed by filtration and washed with high boiling petroleum ether. It amounts to about 63 parts by weight and has a melting point of 107° C. being practically pure. From the filtrate more product can be isolated after evaporation of the solvent. This recovered product (formal) has a melting point of 107°–108° C. after crystallization from methanol. The analysis calculated for $C_{10}H_8Cl_6O_2$ (M.W. 372.90) gave the following composition:

Calc. for C, 32.21; H, 2.16; Cl, 57.05. Found C, 32.48; H, 2.30; Cl, 57.12.

In determining the insecticidal activity of the formal derivative of Example II, the following test procedure was employed:

1. Formulation of formal derivative for testing

A concentrate of the formal derivative is made to contain the following ingredients:

| | |
|---|---|
| Formal derivative _____grams__ | 0.200 |
| Acetone _____ml__ | 10 |
| A wetting and dispersing agent commercially available under the brand name of "Triton X-155" _____ml__ | 0.020 |
| Water in sufficient quantity to make _____ml__ | 100 |

Dilutions are prepared by diluting this concentrate with water to give the desired concentration of the formal derivative insecticide to be used in all screening methods.

2. Method

In the process of evaluating the insecticide, using the bean beetle, and bean aphid, variations of the standard leaf dip method are used, one for preliminary and secondary screening, the second for the determination of 50% and 95% mortality and for critical comparisons of effective insecticides. Both variations are described below.

PRELIMINARY SCREENING AND SECONDARY SCREENING

Two leaves of the tender green bean are dipped in the previously described formulations and are allowed to dry thoroughly without withering by placing the stems in water-filled gas bottles. After the leaves have dried, approximately 1 hour, they are placed in two 9 cm. Petri dishes, the bottoms of which have been lined with filter paper which has been moistened with 1 ml. of water, used to keep the leaf-bait attractive to the bean beetle and bean aphid. Eight bean beetles and 8 bean aphids, 4 replicated Petri dishes of each, 8-9 days old, are immediately placed to feed on the treated leaves. Data on mortality and amount of feeding are recorded after a period of 72 hours.

If no activity (designated by N) or only a moderate amount of activity (designated by F) is indicated at the preliminary screening stage, no further evaluations are necessary. If however, activity is indicated by 75% control or better (designed by P), the formal derivative is carried into the secondary screening stage and is retested in dosage dilution series. Following the 72 hour observations, mortality figures are plotted on log probability paper. From the resulting curves, 50% and 95% mortality are interpolated.

CRITICAL COMPARISON METHOD USED FOR HIGHLY EFFECTIVE MATERIALS OR FOR DETERMINING MINOR DIFFERENCES BETWEEN COMPOUNDS

This method is basically the same as has been described above with the following modifications:

(a) 8 leaves are dipped in the formulation instead of 2.

(b) After the leaves have dried, a leaf punch is used to cut out equal area sections, one from each leaf, placing 2 of the punched circles in each of 4 Petri dishes.

(c) Each of the 4 Petri dishes are infested with 5 Armyworm larvae, a total of 20 insects/concentration.

The standard of the leaf areas and the greater number of insects used, allow a more quantitative evaluation to be made. Observations for this test method of obtaining LD50s (50% mortality) are similar to that described for the preliminary screening test.

In testing for the bean beetle, the test material formulated as above described, was employed in the following manner:

Fourth instar larvae of the Mexican bean beetle, *Epilachna varivestis*, less than one day old within the instar and reared on tendergreen beans under greenhouse conditions, constitute the test insect for this screening method. The test larvae are removed from the colony and held without food, in a glass dish, for 4 hours, prior to being placed on the treated foliage.

APPLICATION OF TOXICANT

Paired seed leaves, excised from tendergreen bean plants, are dipped in the test formulations until they are thoroughly wetted. Excess liquid is removed by gentle shaking. While the leaves are drying in a ventilated hood, wilting is prevented by placing the stem in water. When dry, the paired leaves are separated and each is placed in a 9 cm. Petri dish lined with filter paper. Ten randomly selected larvae are introduced before closing the dish.

HOLDING CONDITIONS

The closed dishes are labeled and held at 75 to 85° F. for 3 days. Although the larvae can easily consume the whole leaf within 24 hours, no more food is added. Check larvae remain vigorous during the entire holding period and do not advance to the quiescent prepupal state. The holding time cannot be reduced to less than 3 days without sacrificing ease of reading the percentage mortality.

RECORD OF RESULTS

Larvae which are unable to move the length of the body (translocate), even upon stimulation by prodding, are considered dead. Possible repellent qualities of the test compounds are recorded as percentage feeding inhibition. While not excluding the possibility of contact insecticidal action, this test will indicate chemicals which display repellent or stomach poison effects in the contact action.

CONCENTRATION OF TOXICANT

The formal derivative is formulated by the foregoing standard procedure of a solution in acetone, addition of an emulsifier and dilution with water. Primary screening tests are run at 2000 p.p.m. In secondary tests the formulation ingredients are maintained at their original concentrations while the concentration of the toxicant is lowered in a dilution series of 2000, 1000 and 500 p.p.m. Advance tests are sometimes necessary to determine LD50 (50% mortality) values. The results obtained are as follows:

| Concentration of Toxicant in p.p.m. | Percent Kill | Percent Feeding Inhibition |
|---|---|---|
| 2,000 | 100 | 99 |
| 1,000 | 100 | 90 |
| 500 | 100 | 60 |

From the bean aphid, the test materials are formulated as above described. In this test, 2" diameter pots, containing 6 to 10 nasturtium plants infested with bean aphids, were removed from a stock culture. The number of aphids to be tested is standardized to 100-150 individuals by trimming off plants containing excess aphids. The plants are then sprayed in the same manner as described for testing mites. After spraying, the plants are placed on their sides in a Petri dish on a sheet of white standard mimeograph paper which has been previously ruled into squares to facilitate counting. The paper is ringed with Tanglefoot glue to prevent the test insects from escaping. Counts are made of the insects which have fallen to the paper and those left on the plant 24 hours after spray application. The results obtained are as follows:

| Concentration of toxicant in p.p.m.: | Percent kill |
|---|---|
| 2000 | 90 |

We claim:
1. The formal of the adduct of 2-butenediol(1,4) with hexachlorocyclopentadiene having the following formula:

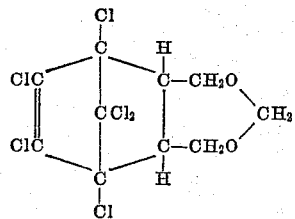

2. The process of preparing the formal of the adduct of 2-butenediol(1,4) with hexachlorocyclopentadiene which comprises condensing 1 mole of said adduct with 1 mole of formaldehyde in the presence of ferric chloride and dioxane as a solvent diluent and recovering the said formal.

3. The process of preparing the acetal of the adduct of 2-butenediol(1,4) with hexachlorocyclopentadiene which comprises condensing 1 mole of said adduct with 1 mole of an organic aldehyde selected from the class consisting of formaldehyde, paraformaldehyde, acetaldehyde, acrolein, benzaldehyde, paratolualdehyde, phenylacetaldehyde, β-naphthaldehyde, furfuraldehyde, in the presence of ferric chloride and dioxane as a solvent diluent and recovering the said formal.

References Cited in the file of this patent
UNITED STATES PATENTS

| | | |
|---|---|---|
| 2,691,026 | Harvey | Oct. 5, 1954 |
| 2,815,350 | Speck | Dec. 3, 1957 |
| 2,904,558 | Prill | Sept. 15, 1959 |

OTHER REFERENCES

Fields: J. Am. Chem. Society, vol. 76, pp. 2709–2710 (1954).